(12) United States Patent
Liu et al.

(10) Patent No.: US 7,812,879 B2
(45) Date of Patent: Oct. 12, 2010

(54) SELF-TRIGGERING CMOS IMAGE SENSOR

(75) Inventors: Xinqiao Liu, Mountain View, CA (US);
Hung Do, San Jose, CA (US)

(73) Assignee: Fairchild Imaging, Milpitas, CA (US)

( * ) Notice: Subject to any disclaimer, the term of this patent is extended or adjusted under 35 U.S.C. 154(b) by 517 days.

(21) Appl. No.: 11/928,285

(22) Filed: Oct. 30, 2007

(65) Prior Publication Data
US 2009/0109313 A1    Apr. 30, 2009

(51) Int. Cl.
*H04N 3/14*    (2006.01)
*H04N 5/335*    (2006.01)

(52) U.S. Cl. .................. 348/308; 348/302; 348/294

(58) Field of Classification Search ......... 348/294–324, 348/362–369
See application file for complete search history.

(56) References Cited

U.S. PATENT DOCUMENTS

| | | | |
|---|---|---|---|
| 5,539,457 A * | 7/1996 | Tsunai | 348/241 |
| 6,040,570 A * | 3/2000 | Levine et al. | 250/208.1 |
| 6,348,681 B1 * | 2/2002 | Kindt et al. | 250/208.1 |
| 6,424,375 B1 * | 7/2002 | Fowler | 348/241 |
| 6,452,633 B1 * | 9/2002 | Merrill et al. | 348/302 |
| 6,498,331 B1 * | 12/2002 | Kozlowski et al. | 250/208.1 |
| 2002/0024605 A1 * | 2/2002 | Merrill et al. | 348/296 |

* cited by examiner

*Primary Examiner*—Jason Chan
*Assistant Examiner*—Tuan H Le
(74) *Attorney, Agent, or Firm*—Calvin B. Ward

(57) ABSTRACT

An image sensor and method for using the image sensor to capture an image are disclosed. The image sensor includes an imaging array, a first block amplifier and a controller. A first plurality of pixels in the imaging array includes pixels having a photodiode connected to a first node by a gate transistor, a reset transistor connected between the first node and a reset node, a pixel amplifier having an input connected to the first node and an output, and an output gate for connecting the pixel amplifier output to an output bus. The sensor has a monitoring mode and an image capture mode. In the monitoring mode the reset node is connected to the first block amplifier whose output is monitored and used to trigger the image capture mode when the output exceeds a predetermined threshold.

17 Claims, 7 Drawing Sheets

SELF-TRIGGERING CMOS IMAGE SENSOR

BACKGROUND OF THE INVENTION

Solid state image sensors have replaced conventional film for capturing images in cameras. The image sensor typically includes a two-dimensional array of pixels. Each pixel includes a photodiode that records the light received at one point in the scene that is being recorded. To capture an image, each pixel is reset prior to the scene being imaged onto the sensor. After a predetermined exposure time, the image is blocked from measuring any further light and the charge stored by each photodiode is readout to provide an image of the scene.

In a conventional camera, the exposure is controlled by a shutter that is triggered in response to the user pushing a button. The image sensor is reset just before the shutter opens and is readout at a predetermined time after the shutter closes. These operations are synchronized to the user pushing the button.

In some applications, the imaging array must determine when the exposure begins without the aid of a synchronization signal such as the user pushing a button. For example, there has been considerable interest in replacing x-ray film images used in dentistry with digital images generated by CMOS image sensors. In these systems, the film that is placed in the patient's mouth is replaced by a CMOS image array that is covered with a layer of scintillation material that converts the x-rays to visible light that can be detected by the image sensor. Conventional x-ray systems using film do not require that the film exposure be synchronized with the x-ray source, since the x-ray pulse determines the exposure. Hence, conventional systems lack a synchronization system that can be used by the solid state image sensor.

To minimize the exposure of the patient to x-rays, the image sensor must be reset as close to the beginning of the x-ray pulse as possible so that a pulse of the minimum duration can be utilized. Any exposure that occurs prior to the image sensor entering the image accumulation mode is wasted, and hence, increases the exposure of the patient without generating a useful image.

In principle, the sensor could be reset sometime prior to the start of the pulse and just wait for the x-ray source to turn on. Unfortunately, the photodiodes in the imaging array generate a non-zero dark current which would be accumulating during the period between the reset and the start of the exposure. The accumulated dark current would result in an unacceptable background that could only be overcome by increasing the exposure. Hence, some other reset strategy is needed.

A number of systems have been proposed to deal with the synchronization of the imaging sensor with the x-ray pulse. The most straight forward approach would be to provide a synchronization signal similar to the pushbutton on a conventional camera. The imaging array could then be reset and the x-ray source triggered in the proper time sequence to minimize the exposure to the patient. Unfortunately, this strategy requires that the existing millions of x-ray machines already in place in dental facilities be modified at a considerable cost. Hence, some other form of triggering system has been sought.

In one class of triggering system, a separate set of detectors is used to detect the beginning of the x-ray exposure and trigger the reset, image acquisition, and readout when x-rays are detected. These additional detectors typically include additional photodiodes that are placed around the image sensor and are monitored to determine the start of the exposure. This type of system has three problems. First, the area of the separate sensors is relatively small, and hence, the sensitivity of the detection is less than ideal. In essence, the exposure sensors are equivalent to a few extra pixels in the image plane. The position of these sensors is behind the teeth or jaw bone, and hence, the time needed to provide a sufficient signal is of the order of the time needed to provide an image. Accordingly, the exposure of the patient to the x-rays is increased. Second, the sensors do not sample the entire image, and hence, the triggering decision is made on data that is not necessarily representative of the image. Finally, the sensors are often separate from the array, and hence, the cost of the sensor is increased.

In another class of prior art system, the imaging array is continually cycled. During each cycle, the imaging array is reset, allowed to accumulate charge for a predetermined period of time and then readout. If the image that is readout indicates the accumulation of a significant charge above that expected from the dark current, the system assumes that the exposure has begun, and the array is reset and allowed to accumulate the final image. This system has a better signal-to-noise ratio than systems based on a few small sensors, since the charge from a more representative set of photodiodes in the actual image is added together to make the triggering decision. Unfortunately, this system has a high power consumption due to the repeated readout cycles. The high power consumption is particularly problematic in applications that rely on battery power. In addition, the detection time is increased by the time needed to readout each image during the detection phase.

SUMMARY OF THE INVENTION

The present invention includes an image sensor and method for using the image sensor to capture an image. The image sensor includes an imaging array, a first block amplifier and a controller. The imaging array includes a first plurality of pixels in which each pixel includes a photodiode connected to a first node by a gate transistor, a reset transistor connected between the first node and a reset node, a pixel amplifier having an input connected to the first node and an output, and an output gate for connecting the pixel amplifier output to an output bus. The controller receives the first block amplifier output and provides a monitoring mode in which the reset transistors and the gate transistors are in a conductive state and the reset node is connected to the first block amplifier input. The controller also provides an image capture mode in which the reset transistors and the gate transistors are in a non-conductive state and a reset mode in which the reset transistors and the gate transistors are in the conductive state and the reset node is connected to the power rail. The controller switches from the monitoring mode to the image capture mode in response to the first block amplifier output exceeding a predetermined value.

The imaging array can also include a second plurality of pixels connected to a second reset node and a second block amplifier. In such embodiments, the controller also receives the second block amplifier output and, in the monitoring mode, the reset node of the second plurality of pixels is connected to the second block amplifier and the reset transistors and the gate transistors are in the conductive state. The controller switches from the monitoring mode to the image capture mode in response to either the first or the second block amplifier outputs exceeding a predetermined value.

DETAILED DESCRIPTION OF THE PREFERRED EMBODIMENTS OF THE PRESENT INVENTION

Figure 1:
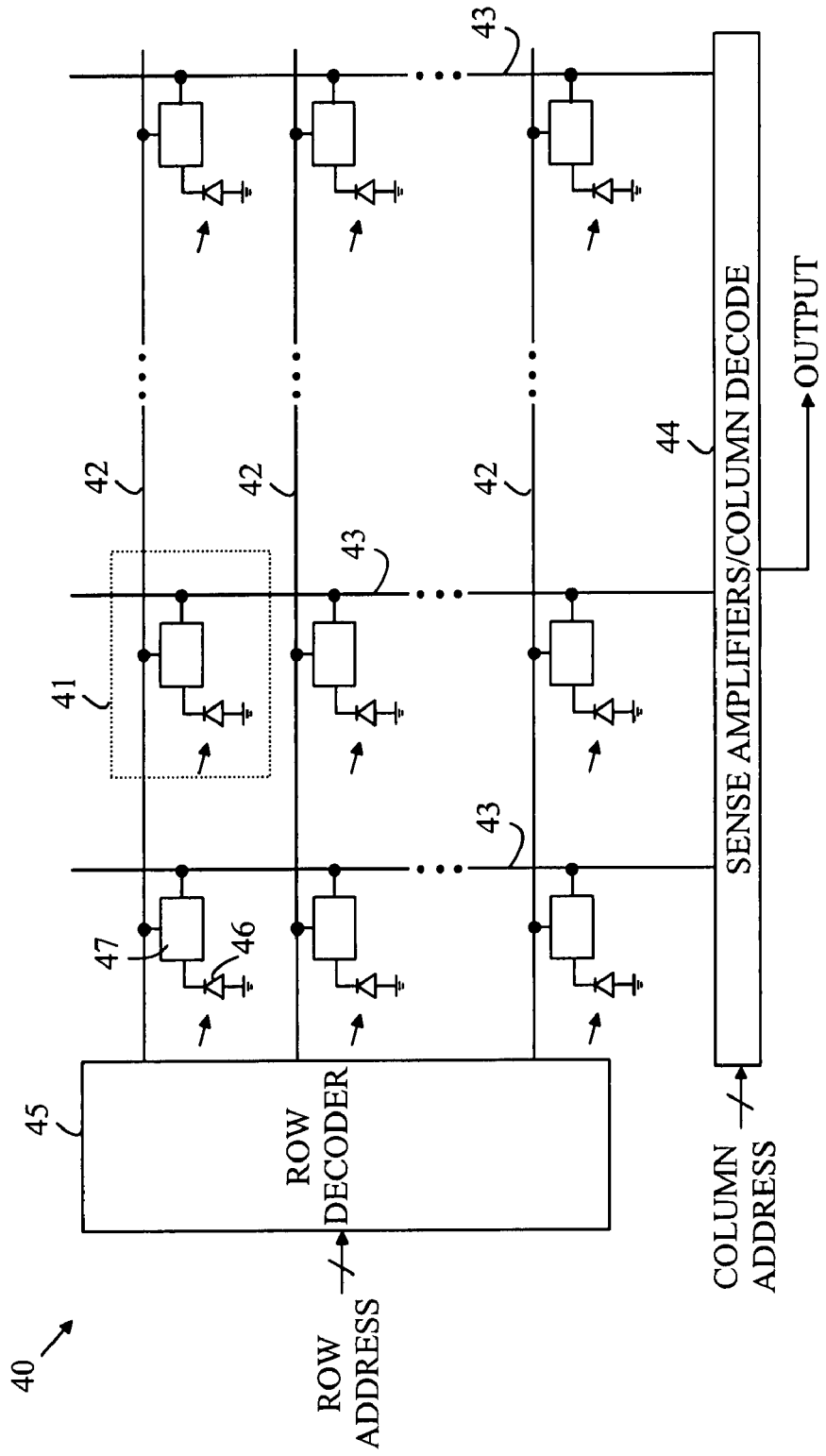
FIG. 1 is a schematic drawing of a prior art CMOS imaging array.

The manner in which the present invention provides its advantages can be more easily understood with reference to FIG. 1, which is a schematic drawing of a prior art CMOS imaging array. Imaging array 40 is constructed from a rectangular array of pixel sensors 41. Each pixel sensor includes a photodiode 46 and an interface circuit 47. The details of the interface circuit depend on the particular pixel design. However, all of the pixel sensors include a gate that is connected to a row line 42 that is used to connect that pixel sensor to a bit line 43. The specific row that is enabled at any time is determined by a row address that is input to a row decoder 45. The row select lines are a parallel array of conductors that run horizontally in the metal layers over the substrate in which the photodiodes and interface circuitry are constructed.

The various bit lines terminate in a column processing circuit 44 that typically includes sense amplifiers and column decoders. The bit lines are a parallel array of conductors that run vertically in the metal layers over the substrate in which the photodiode and interface circuitry are constructed. Each sense amplifier reads the signal produced by the pixel that is currently connected to the bit line processed by that sense amplifier. The sense amplifiers may generate a digital output signal by utilizing an analog-to-digital converter (ADC). At any given time, a single pixel sensor is readout from the imaging array. The specific column that is readout is determined by a column address that is utilized by a column decoder to connect the sense amplifier/ADC output from that column to circuitry that is external to the imaging array.

To provide low noise, all of the electrons must be removed from the photodiodes when the photodiodes are reset at the beginning of an exposure. To assure complete reset, pinned photodiodes are utilized. In a pinned photodiode, the charge generated by the photons is stored in a potential well that is at a lower potential than the region in which the charge is generated. The storage region is adjacent to a gate transistor. When the gate transistor is placed in a conductive state, all of the charge moves out of the gate, and hence, the photodiode can be reset.

Figure 2:
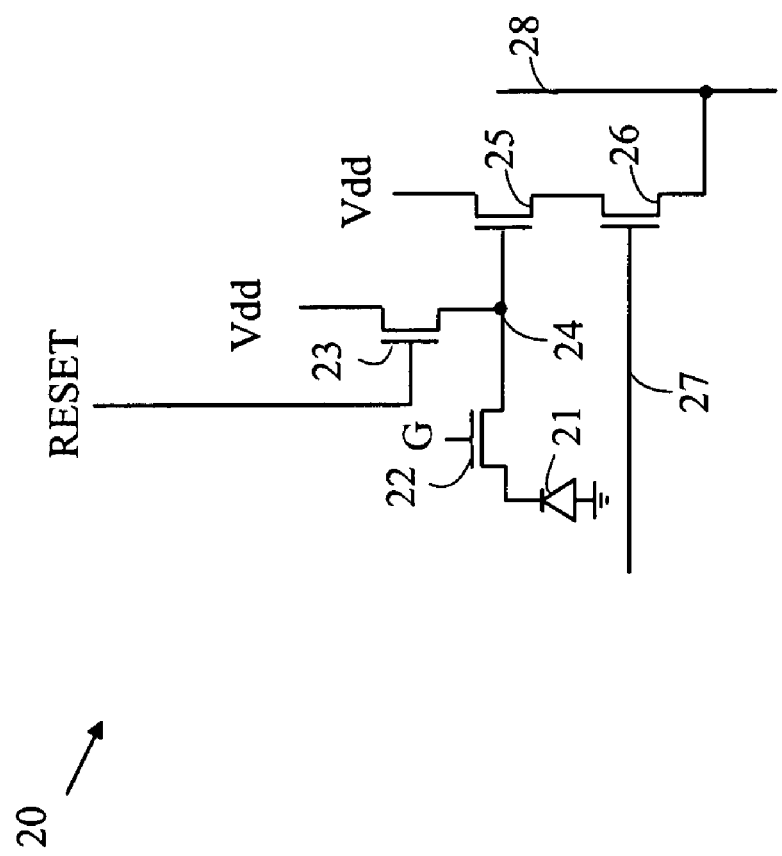
FIG. 2 is a schematic drawing of a prior art pixel sensor that is commonly used in CMOS imaging arrays.

Refer now to FIG. 2, which is a schematic drawing of a prior art pixel sensor that is commonly used in CMOS imaging arrays. Pixel sensor 20 includes 4 transistors and is often referred to as a 4T pixel cell. Photodiode 21 is reset prior to the image exposure by placing gates 22 and 23 in the conductive state, such that the cathode of photodiode 21 is connected to $V_{dd}$. After the reset operation, gates 22 and 23 are placed in the non-conductive state. During the image exposure, a charge that is related to the light exposure is stored adjacent to gate 22 in photodiode 21. During readout, charge from photodiode 21 is gated onto node 24 by transistor 22 and converted to a voltage by transistor 25. When pixel sensor 20 is selected by a signal on row line 27, transistor 26 applies this voltage to bit line 28.

One embodiment of the present invention utilizes an arrangement in which the imaging array can be reconnected in a manner that allows all of the individual photodiodes to be connected together in parallel. When so connected, the imaging array will be referred to as being in the monitoring mode. In the monitoring mode, the imaging array generates a signal that is proportional to the sum of the average light intensity received by the imaging array and the total dark current generated by all of the pixels in the array. Hence, any change in the illumination received by the array will be reflected in a large increase in this signal, since the effective area of the light receiver is now increased by N fold, where N is the number of pixels in the array. Furthermore, the signal-to-noise ratio is much higher than that obtained with a single photodiode, and hence, any low light level signal changes can be easily detected. In addition, the total array is effectively one large detector; hence a change in illumination that only covers any portion of the array area can be detected.

Figure 3:
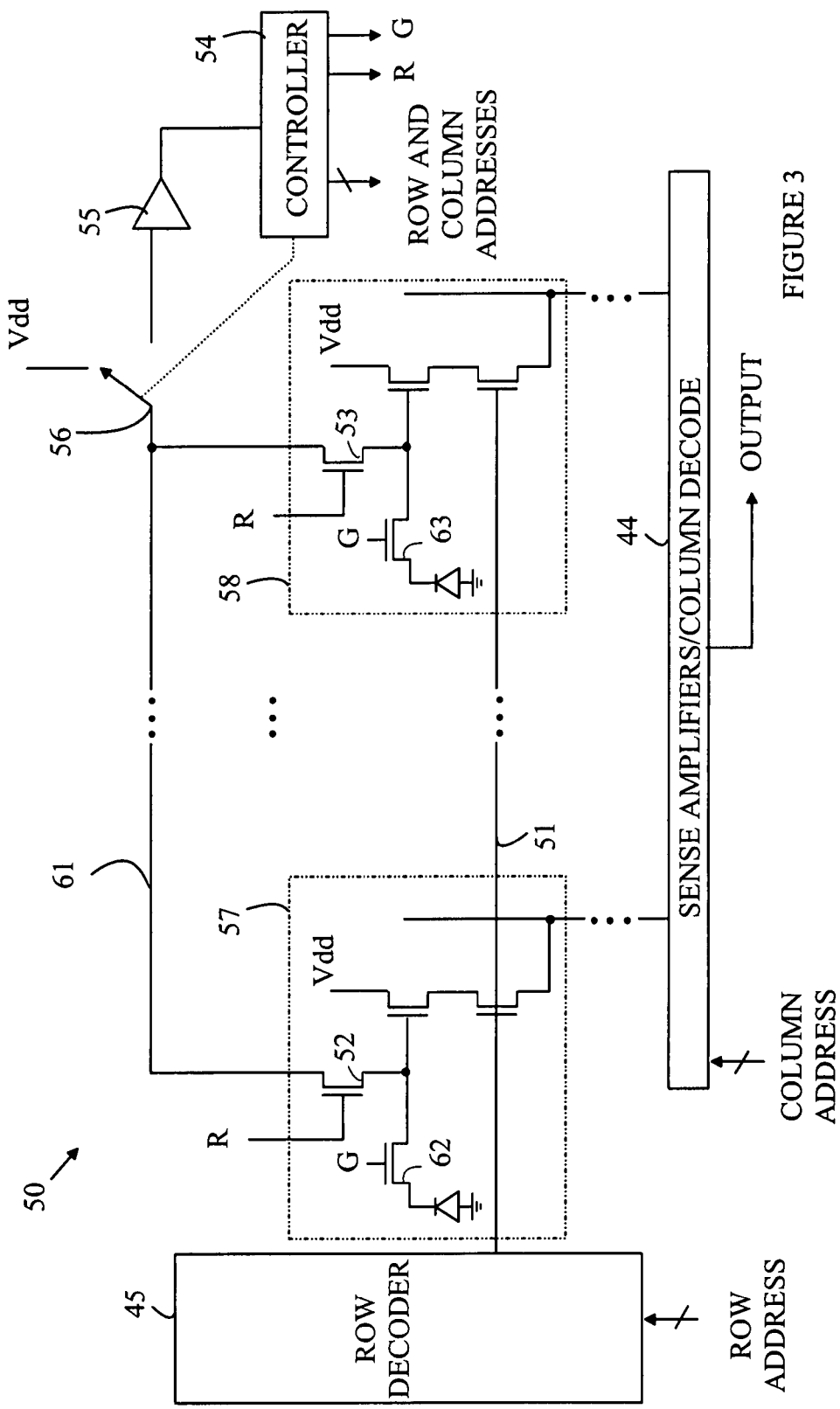
FIG. 3 illustrates one embodiment of an imaging array according to the present invention.

Refer now to FIG. 3, which illustrates one embodiment of an imaging array according to the present invention. Imaging array 50 is organized as a two-dimensional array of pixels in a manner analogous to that described above. All of the pixels in a given column are connected to a bit line corresponding to that column, and all of the pixels in a given row are connected to a row line associated with that row. To simplify the drawing, only two of the pixels, 57 and 58, on a single row line 51 are shown.

Structurally, the pixels are the same as those described with reference to FIG. 2. Each pixel includes a photodiode that is connected to a source follower by a gate transistor. The gate transistors corresponding to pixels 57 and 58 are shown at 62 and 63, respectively. The output of the source follower is connected to the corresponding bit line by a gate transistor that is connected to the row line corresponding to the row in which the pixel is located. The pixel is reset by connecting the photodiode to a reset voltage using a reset transistor. The reset transistors corresponding to pixels 57 and 58 are shown at 52 and 53 respectively. The reset transistors are connected in parallel to a node 61 that can be selectively switched between the reset voltage, $V_{dd}$, and the input to an amplifier 55 by a switch 56 that is under the control of controller 54.

In the monitor mode, the gate transistors and the reset transistors are set to the conducting state. It should be noted that this operation requires no additional conductors or transistors within the pixel array and can be accomplished with minimal circuitry in controller 54 over that already present to operate the reset and readout functions of a conventional CMOS imaging array. To simplify the drawing, the connections between controller 54 and the gates of the gate and reset transistors have been omitted.

Figure 4:
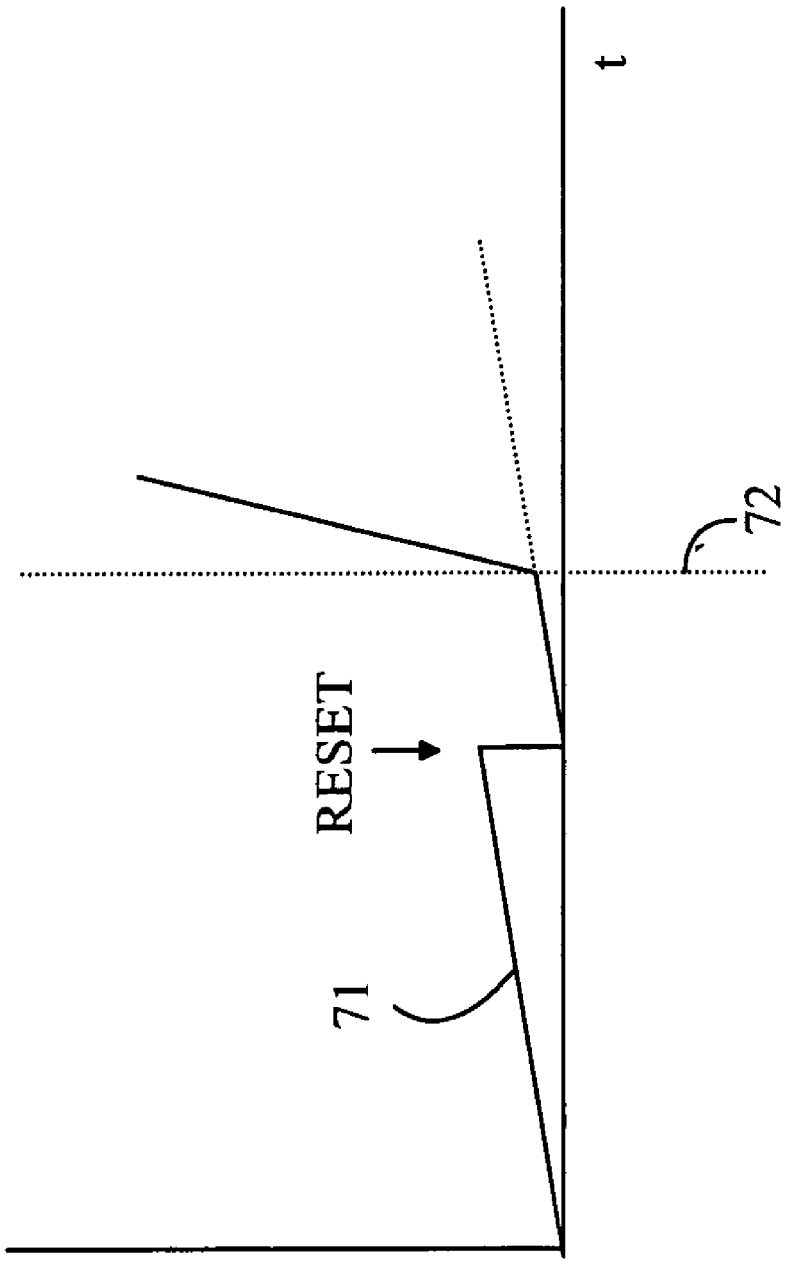
FIG. 4 illustrates S(t) which denotes the amplifier output as a function of time.

Denote the output of amplifier 55 as a function of time by S(t). Refer now to FIG. 4, which illustrates S(t). As noted above, the individual photodiodes generate a dark current even in the absence of light falling on the photodiodes. This dark current causes a charge to accumulate at the input to amplifier 55, and hence, the output of amplifier 55 increases linearly with time even in the absence of light on the imaging array as shown in region 71. To prevent this accumulated charge from saturating amplifier 55, the photodiodes are periodically reset by switching node 61 back to $V_{dd}$ at predetermined times relative to the start of the monitoring mode.

Hence, in the absence of light on the imaging array, S(t) is a sawtooth waveform. The slope of this waveform can be determined for any given imaging array by controller 54.

Since the size of the equivalent single photodiode in the monitoring mode is large, the statistical reproducibility of S(t) in the monitoring mode is high, and thus, any deviation from this waveform is easily detected. Accordingly, when an image is applied to the imaging array, S(t) increases rapidly from the known values for S(t) in the monitoring mode as shown at 72 in FIG. 4. This increase is detected by controller 54, which then resets the imaging array by switching node 61 to $V_{dd}$ for a brief period of time. The gate transistors and reset transistors are then placed in a non-conducting state and the image exposure begins. After the image exposure, the image is readout in the usual manner.

A triggering algorithm that depends on the known rate of increase of the dark current component of S(t) reduces the delay between the start of the image and the time the imaging array begins its exposure. However, other simpler algorithms can also be advantageously utilized. For example, an algorithm that switches out of monitoring mode when S(t) crosses some predetermined fixed threshold could also be utilized.

The above-described embodiments use a change in S(t) to determine the point at which an image is projected onto the imaging array. However, changes in S(t) can also be utilized to monitor a field of view for changes. In this regard, it should be noted that when an image is present, S(t) represents the average light intensity of the image if the dark current is a small fraction of the total photocurrent.

In surveillance applications, it is advantageous to provide a motion detection signal that detects a change in the field of view of the surveillance camera. One class of system continuously reads out images and compares the current image to the previous image to determine if the scene in the field of view of the camera has changed. In systems in which the camera is operated on a limited power source, such as batteries, continuously reading out images and comparing successive images to detect scene changes results in a significant power drain.

Most scene changes result in a change in the average light intensity in the scene. Hence, an imaging array according to the present invention can be used as a detector of scene changes without the need to readout and process an image until after the scene has changed. Furthermore, during the monitoring mode, the hardware in the controller that is responsible for image processing can be turned off, and hence, the power drain associated with image processing can be further reduced. Once a change in the light level is detected, the array would be reset and an image taken.

The above-described embodiments utilize a monitoring mode in which all of the pixels in the imaging array are connected together to form one large "super pixel". However, embodiments in which the pixels are divided into smaller groupings can also be advantageously utilized in some applications. For example, the pixels could be divided into contiguous groups that provide a more refined measurement of the changes in intensity in specific parts of the image.

Figure 5:
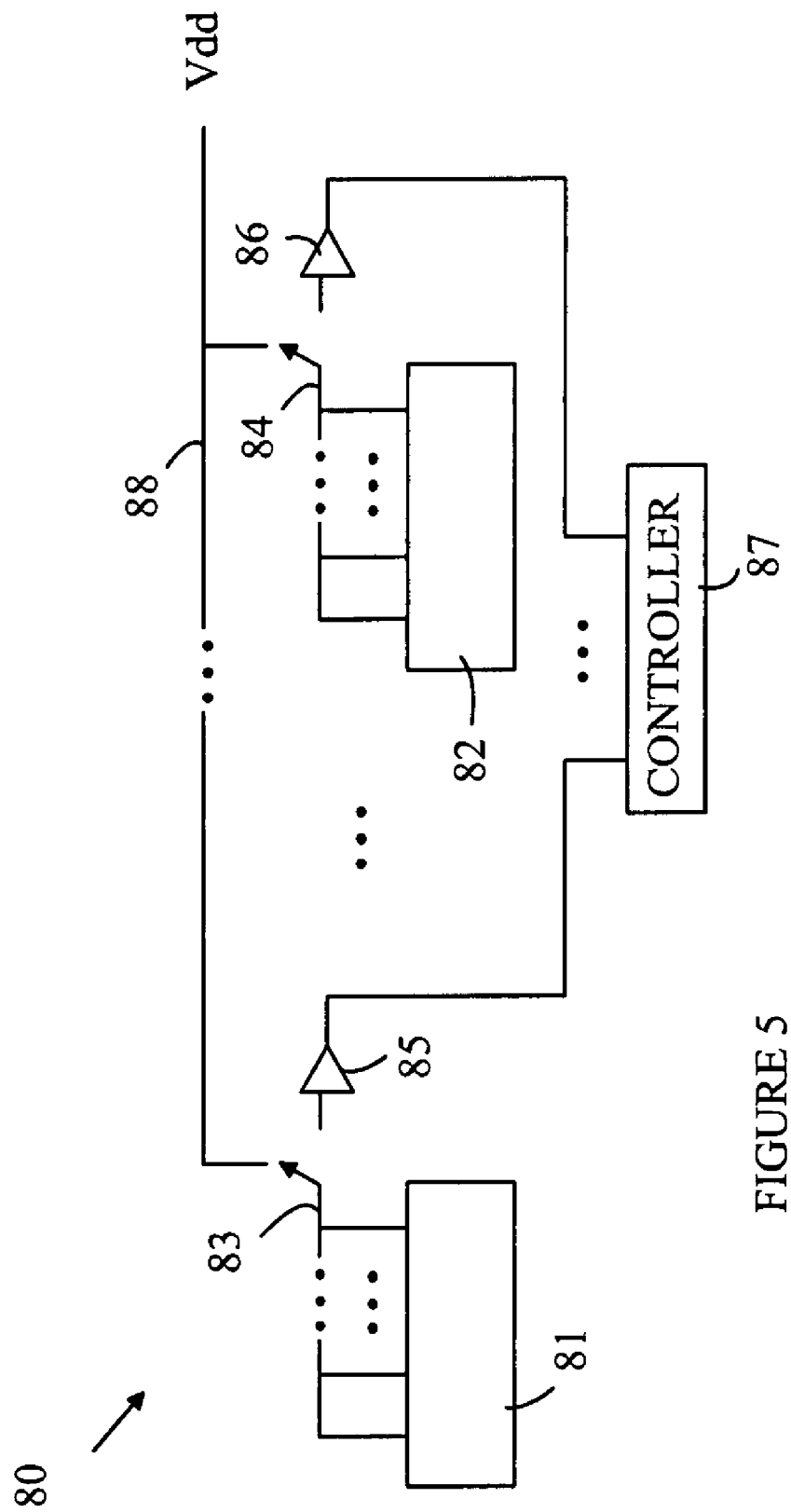
FIG. 5 illustrates another embodiment of an image sensor according to the present invention.

Refer now to FIG. 5, which illustrates another embodiment of an image sensor according to the present invention. Image sensor 80 has the same two-dimensional row-column structure as the embodiments discussed above. Each pixel is connected to a row select line and a bit line. Image sensor 80 is also divided into a plurality of contiguous blocks of pixels. Exemplary blocks are shown at 81 and 82. With each block, the source of each of the reset transistors is connected to a switch that either connects the sources to a bus 88 connected to a power rail or to a block amplifier associated with that block. The switches corresponding to blocks 81 and 82 are shown at 83 and 84, respectively, and the block amplifiers associated with blocks 81 and 82 are shown at 85 and 86, respectively. The switches are set by controller 87, which also monitors the output of the block amplifiers. During the monitoring phase, controller 87 monitors the output of each of the block amplifiers for a change in the output voltage that is indicative of a change in the portion of the image associated with that block amplifier in a manner analogous to that discussed above. The block amplifiers provide a motion detection signal that is localized to the portion of the image monitored by the pixels associated with that block. Hence, the signals will be more sensitive to small objects moving within the field of view of those pixels.

Refer again to FIG. 2. The above-described embodiments of the present invention utilize a 4 transistor pixel cell in which the amplification function is provided by transistor 25. However, embodiments in which the amplification function is provided by a more complex amplifier that provides greater gain for use in low light imaging applications can also be constructed.

The above-described embodiments of the present invention utilize an imaging array having a two-dimensional array of pixels organized as a plurality of rows and columns. However, embodiments utilizing pixel arrays having different configurations could also be utilized depending on the application. For example, an imaging array having a linear configuration could be provided with a pixel monitoring system according to the present invention. Linear arrays of pixels are often utilized in image capture systems in which the image is caused to move relative to the imaging sensor. Topologically, such a linear array is similar to one column of pixels in the two-dimensional arrays discussed above.

Figure 6:
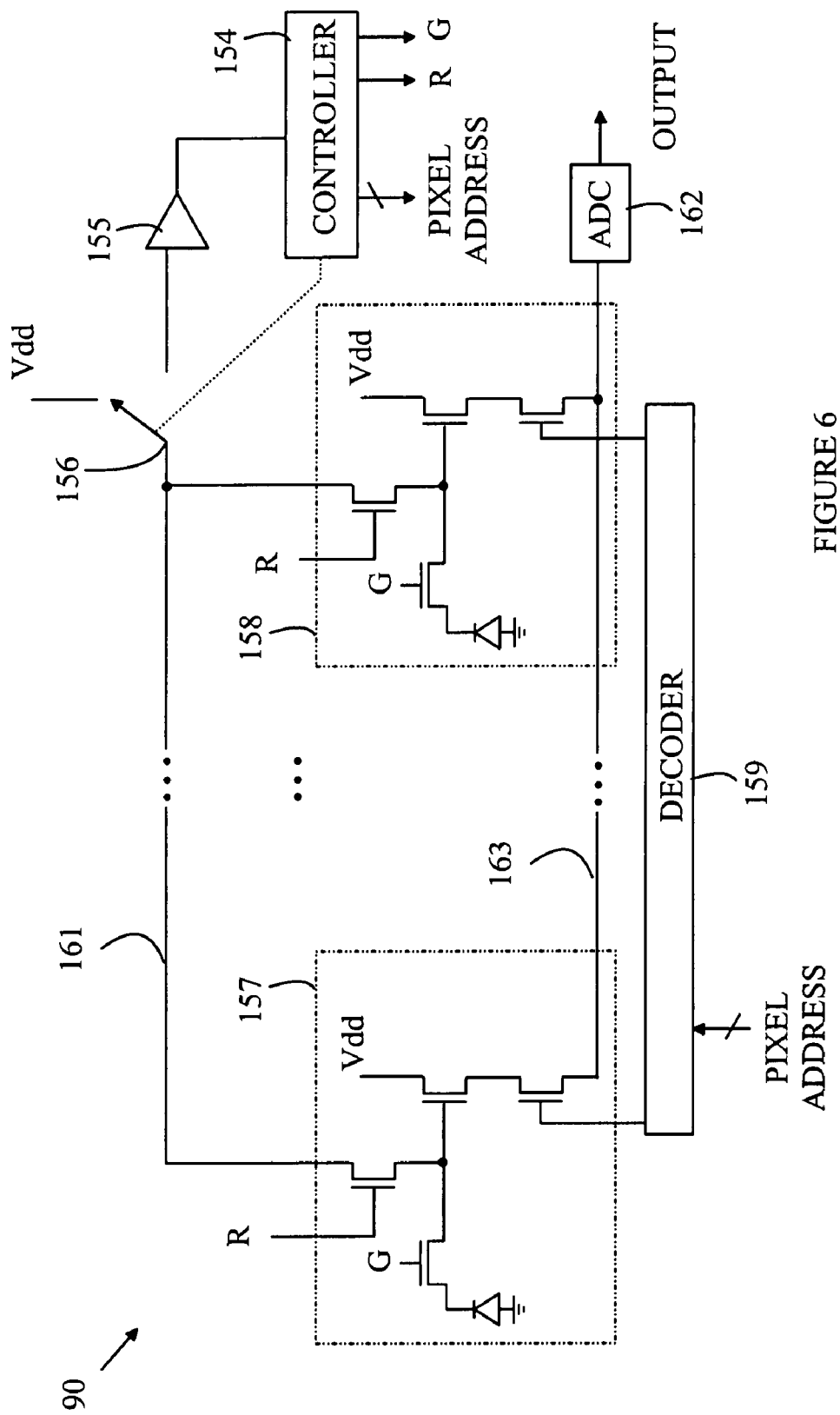
FIG. 6 illustrates one embodiment of a one-dimensional image sensor according to the present invention.

Refer now to FIG. 6, which illustrates one embodiment of a one-dimensional image sensor according to the present invention. Image sensor 90 includes a plurality of pixels such as pixels 157 and 158. The sources of the reset transistors are connected to node 161 which includes a switch 156 that allows controller 154 to connect node 161 to $V_{dd}$ or amplifier 155. During the monitoring mode, switch 156 is set to connect node 161 to amplifier 155 in a manner analogous to that discussed above. When the output of amplifier 155 exceeds a predetermined threshold, switch 156 is set to connect node 161 to $V_{dd}$ and the pixels are reset. The gate and reset transistors are then placed in the non-conducting state and the image is accumulated. The image is readout by sequentially connecting each pixel to readout bus 163 using decoder 159. An analog-to-digital converter 162 digitizes the voltage on bus 163 to provide a digital output signal.

Figure 7:
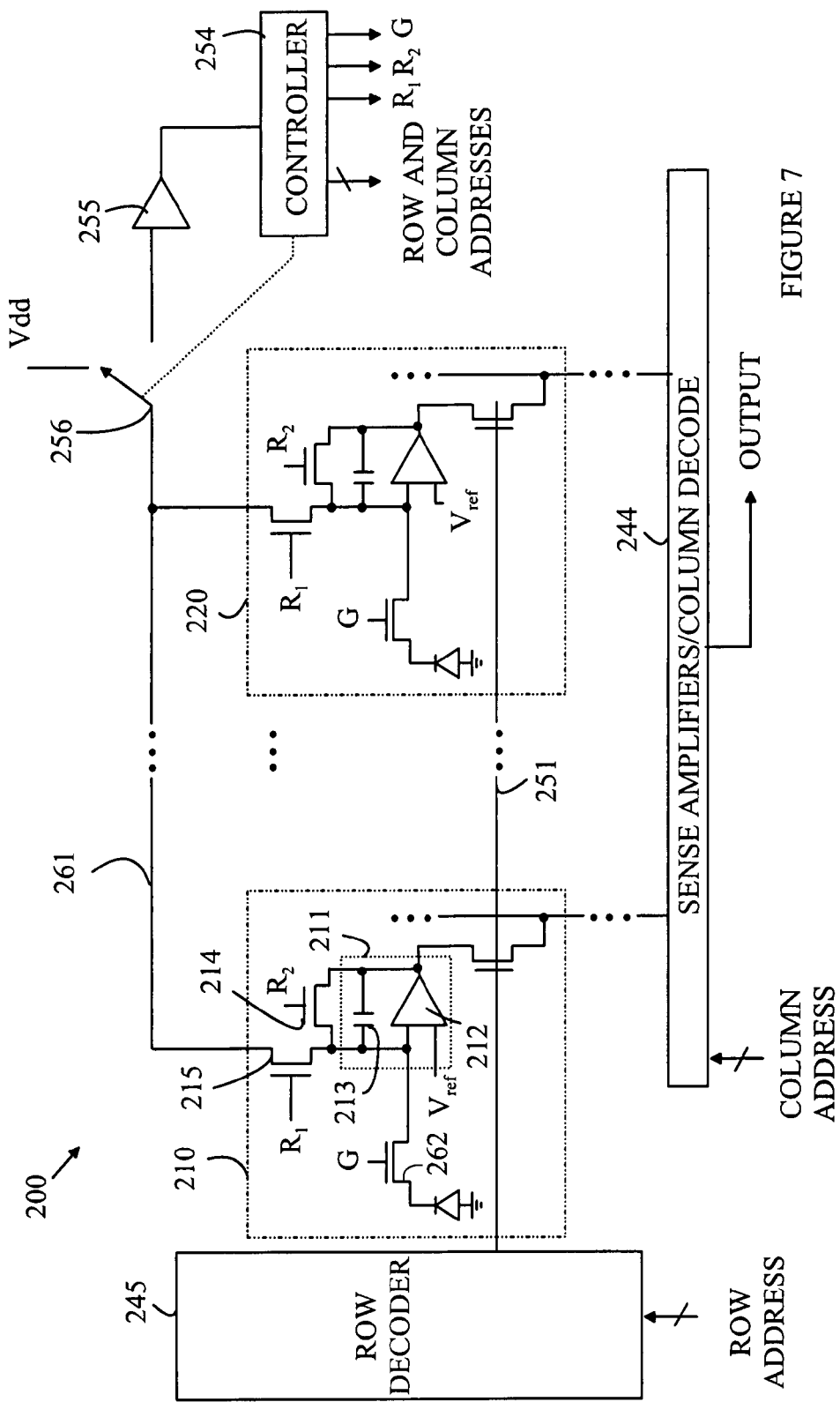
FIG. 7 illustrates a portion of an imaging array according to another embodiment of the present invention.

The above-described embodiments of the present invention utilize a pixel design in which the charge output of the photodiode is converted to a voltage by a single transistor connected in a source follower configuration. However, other forms of pixels could be utilized. Refer now to FIG. 7, which illustrates a portion of an imaging array according to another embodiment of the present invention. FIG. 7 shows two pixels 210 and 220 that are connected to the same row line 251 in the two-dimensional array of pixels. Pixels 210 and 220 utilize a capacitive transimpedance amplifier 211 constructed from amplifier 212 and capacitor 213 in place of the source follower utilized in the above-described embodiments.

Imaging array 200 has a monitoring mode and an image acquisition mode. During the image acquisition mode, the pixel is first reset by placing transistors 214 and 215 in the conducting state and connecting line 261 to $V_{dd}$ using switch 256. Gate 262 is also placed in the conducting state during the reset operation. After the pixels have been reset, gate 261, and transistors 214-215 are returned to the non-conducting state. During the image exposure, charge collects in the photodiodes. The charge is readout by placing gate 262 in the conducting state to transfer the charge to the input of amplifier 212. The pixels are readout one row at a time in a manner analogous to that described above. The voltage on the bit lines is typically digitized in the column decoder prior to being output.

During the monitoring mode, line 261 is connected to amplifier 255 by controller 254. In addition, transistors 215 and 262 are placed in the conducting state in all of the pixels. Hence, any charge generated in the photodiodes is transferred to amplifier 255 and monitored by controller 254 in a manner analogous to that described above. When the detected charge indicates that the array is being illuminated, controller 254 causes imaging array 200 to enter the image acquisition mode.

Various modifications to the present invention will become apparent to those skilled in the art from the foregoing description and accompanying drawings. Accordingly, the present invention is to be limited solely by the scope of the following claims.

What is claimed is:

1. An image sensor comprising:
an imaging array comprising a first plurality of pixels, each pixel comprising:
a photodiode connected to a first node by a gate transistor;
a reset transistor connected between said first node and a reset node; and
a pixel amplifier having an input connected to said first node and an output; and an output gate for connecting said pixel amplifier output to an output bus;
a first block amplifier having an input and output; and
a controller that receives said first block amplifier output and provides a monitoring mode in which said reset transistors and said gate transistors are in a conductive state and said reset node is connected to said first block amplifier input.

2. The image sensor of claim 1 wherein said first plurality of pixels comprises a two-dimensional array of pixels organized as a plurality of rows and columns, said pixels in each row having said output gates connected to a row select conductor, said pixels in each column having said pixel amplifier output connected to a bit line corresponding to that cell, said bit lines being part of said output bus.

3. The image sensor of claim 1 wherein said pixel amplifier comprises a FET connected as a source follower.

4. The image sensor of claim 1 wherein said pixel amplifier comprises a transimpedance amplifier.

5. The image sensor of claim 1 wherein said controller provides an image capture mode in which said reset transistors and said gate transistors are in a non-conductive state and a reset mode in which said reset transistors and said gate transistors are in said conductive state and said reset node is connected to a power rail.

6. The image sensor of claim 5 wherein said controller switches from said monitoring mode to said image capture mode in response to said first block amplifier output exceeding a predetermined value.

7. The image sensor of claim 6 wherein said controller switches from said monitoring mode to said reset mode and back to said monitoring mode after said image sensor has been in said monitoring mode for a predetermined period of time.

8. The sensor of claim 6 wherein said predetermined value depends on the time since said imaging array entered said monitoring mode.

9. The image sensor of claim 6 wherein said controller switches to said reset mode prior to switching to said image capture mode.

10. The image sensor of claim 6 wherein said controller also provides an image readout mode in which each of said output gates is sequentially connected to said output bus.

11. The image sensor of claim 5 wherein said imaging array further comprises a second plurality of pixels, each pixel comprising:
a photodiode connected to a first node by a gate transistor;
a reset transistor connected between said first node and a reset node; and
a pixel amplifier having an input connected to said first node and an output; and an output gate for connecting said pixel amplifier output to an output bus;
said imaging array further comprising a second block amplifier having an input and an output,
wherein said controller also receives said second block amplifier output and wherein, in said monitoring mode, said reset node of said second plurality of pixels is connected to said second block amplifier and said reset transistors and said gate transistors are in said conductive state.

12. The image sensor of claim 11 wherein said controller switches from said monitoring mode to said image capture mode in response to said second block amplifier output exceeding a predetermined value.

13. A method for acquiring an image comprising:
providing an array of pixels, each pixel comprising:
a photodiode connected to a first node by a gate transistor;
a reset transistor connected between said first node and a reset node;
a pixel amplifier having an input connected to said first node and an output; and an output gate for connecting said pixel amplifier output to an output bus;
providing a monitoring mode in which said reset transistors and said gate transistors are in a conductive state and a monitor signal derived from said reset node is compared to a predetermined value; and
switching from said monitoring mode to an image capture mode in which said reset transistors and said gate transistors are in a non-conductive state if said monitor signal is greater than said predetermined value.

14. The method of claim 13 further comprising entering a reset mode in which said reset transistors and said gate transistors are in said conductive state and said reset node is connected to said power rail prior to entering said image capture mode.

15. The method of claim 14 wherein said imaging array is switched to said reset mode and back to said monitoring mode after said image array has been in said monitoring mode for a predetermined period of time.

16. The method of claim 13 wherein said predetermined value depends on the time since said imaging array entered said monitoring mode.

17. The method of claim 13 further comprising measuring said monitor signal as a function of time when no image is present on said imaging array, said predetermined value depending on said measurements of said monitor signal.

* * * * *